US012792092B2

(12) United States Patent
Carnevali et al.

(10) Patent No.: US 12,792,092 B2
(45) Date of Patent: Nov. 10, 2026

(54) PEDESTAL MOUNTS AND DOCKS FOR MOBILE DEVICES AND METHODS OF MAKING AND USING

(71) Applicant: National Products, Inc., Seattle, WA (US)

(72) Inventors: Jeffrey D. Carnevali, Seattle, WA (US); Stefan Michael Gottschalk, Seattle, WA (US)

(73) Assignee: National Products, Inc., Seattle, WA (US)

( * ) Notice: Subject to any disclaimer, the term of this patent is extended or adjusted under 35 U.S.C. 154(b) by 142 days.

(21) Appl. No.: 19/008,180

(22) Filed: Jan. 2, 2025

(65) Prior Publication Data

US 2026/0186533 A1 Jul. 2, 2026

(51) Int. Cl.
*G06F 1/16* (2006.01)

(52) U.S. Cl.
CPC ............ *G06F 1/1632* (2013.01); *G06F 1/166* (2013.01)

(58) Field of Classification Search
CPC .. F16M 11/2014; F16M 11/08; G06F 1/1632; G06F 1/166; G06F 1/1654; F16B 7/042; F16B 7/0406; Y10T 403/32557; Y10T 403/32581
USPC ........... 248/121, 122.1, 125.7; 403/112–113, 403/116–117
See application file for complete search history.

(56) References Cited

U.S. PATENT DOCUMENTS

| | | | |
|---|---|---|---|
| 809,977 | A | 1/1906 | O'Brien |
| 1,786,459 | A | 12/1930 | Simons |
| 2,495,552 | A | 1/1950 | Schmitz |

(Continued)

FOREIGN PATENT DOCUMENTS

| | | |
|---|---|---|
| CN | 1312603 | 9/2001 |
| CN | 101674096 | 3/2010 |

(Continued)

OTHER PUBLICATIONS

Otterbox Product directory, 20 pages of product description of Otter Box waterproof boxes retrieved from web site at: www.otterbox.com Dated Sep. 2, 2005. Otter Products, LLC, Bldg. 1 Old-Town Square, Suite 303, Fort Collins, CO 80524 Phone: 1-888-695-8820, 970-493-8446; Facsimile: 1-888-695-8827, 970-493-1755.

(Continued)

*Primary Examiner* — Ingrid M Weinhold
(74) *Attorney, Agent, or Firm* — Branch Partners PLLC; Bruce E. Black

(57) ABSTRACT

A mount for a mobile device includes a mounting arm for coupling a dock; an axle coupled to the mounting arm; a first tube arrangement including a first tube and at least a pair of axle posts extending from the first tube; a second tube arrangement including a base and a second tube extending from the base; and a lever disposed along a one of the first tube or the second tube, wherein the lever includes a lever post disposed along an end portion; wherein another one of the first tube or the second tube defines a first cutout extending around at least 50% of its circumference to receive the lever post and permit travel of the lever post along the first cutout so that a dock, when attached, is rotatable about two different axes when the lever post is received in the first cutout.

20 Claims, 9 Drawing Sheets

(56) References Cited

U.S. PATENT DOCUMENTS

| | | | |
|---|---|---|---|
| 2,549,917 | A | 4/1951 | Millbrandt |
| 2,565,939 | A | 8/1951 | Wriston |
| 2,612,947 | A | 10/1952 | Jenks |
| 2,717,093 | A | 9/1955 | Mautner |
| 2,803,368 | A | 8/1957 | Koch |
| 3,018,525 | A | 1/1962 | Deisenroth |
| 3,140,883 | A | 7/1964 | Anthony |
| 3,464,579 | A | 9/1969 | Asenbauer |
| 3,667,648 | A | 6/1972 | Koziol |
| 3,808,577 | A | 4/1974 | Mathauser |
| 3,885,701 | A | 5/1975 | Becklin |
| 3,972,459 | A | 8/1976 | Cooper |
| 3,978,830 | A | 9/1976 | Toth, Jr. |
| 4,298,204 | A | 11/1981 | Jinkins |
| 4,564,880 | A | 1/1986 | Christ et al. |
| 4,607,772 | A | 8/1986 | Hancock |
| 4,828,558 | A | 5/1989 | Kelman |
| 4,842,174 | A | 6/1989 | Sheppard et al. |
| 4,848,319 | A | 7/1989 | Appeldorn |
| 5,002,184 | A | 3/1991 | Lloyd |
| 5,052,943 | A | 10/1991 | Davis |
| 5,096,317 | A | 3/1992 | Phillippe |
| 5,135,189 | A | 8/1992 | Ghazizadeh |
| 5,246,133 | A | 9/1993 | James |
| 5,272,771 | A | 12/1993 | Ansell et al. |
| 5,295,602 | A | 3/1994 | Swanson |
| 5,353,934 | A | 10/1994 | Yamauchi |
| 5,388,692 | A | 2/1995 | Withrow et al. |
| 5,457,745 | A | 10/1995 | Wang |
| 5,535,274 | A | 7/1996 | Braitberg et al. |
| 5,584,054 | A | 12/1996 | Tyneski et al. |
| 5,586,002 | A | 12/1996 | Notarianni |
| 5,641,065 | A | 6/1997 | Owens et al. |
| 5,646,649 | A | 7/1997 | Iwata et al. |
| 5,708,707 | A | 1/1998 | Halttunen et al. |
| 5,791,506 | A | 8/1998 | Sheffler et al. |
| 5,813,096 | A | 9/1998 | Soennichsen |
| 5,822,427 | A | 10/1998 | Braitberg et al. |
| 5,842,670 | A | 12/1998 | Nigoghosian |
| 5,845,885 | A | 12/1998 | Carnevali |
| 5,860,550 | A | 1/1999 | Miller et al. |
| 5,888,087 | A | 3/1999 | Hanson et al. |
| 5,895,018 | A | 4/1999 | Rielo |
| 5,953,795 | A | 9/1999 | Bauer |
| 5,969,057 | A | 10/1999 | Schoeley et al. |
| 5,990,874 | A | 11/1999 | Tsumura et al. |
| 5,992,807 | A | 11/1999 | Tarulli |
| 6,009,601 | A | 1/2000 | Kaufman |
| 6,010,005 | A | 1/2000 | Reames et al. |
| 6,032,910 | A | 3/2000 | Richter |
| 6,034,505 | A | 3/2000 | Arthur et al. |
| 6,035,800 | A | 3/2000 | Clifford |
| 6,043,626 | A | 3/2000 | Snyder et al. |
| 6,068,119 | A | 5/2000 | Derr et al. |
| 6,149,116 | A | 11/2000 | Won |
| 6,191,943 | B1 | 2/2001 | Tracy |
| D439,218 | S | 3/2001 | Yu |
| 6,229,893 | B1 | 5/2001 | Chen |
| 6,273,773 | B1 | 8/2001 | Bourke |
| 6,276,552 | B1 | 8/2001 | Vervisch |
| 6,295,198 | B1 | 9/2001 | Loh et al. |
| 6,317,313 | B1 | 11/2001 | Mosgrove et al. |
| 6,341,218 | B1 | 1/2002 | Poplawsky et al. |
| 6,356,053 | B1 | 3/2002 | Sandoz et al. |
| 6,377,825 | B1 | 4/2002 | Kennedy et al. |
| 6,392,882 | B1 | 5/2002 | Chen et al. |
| 6,406,758 | B1 | 6/2002 | Bottari et al. |
| 6,407,860 | B1 | 6/2002 | Funazaki et al. |
| 6,438,229 | B1 | 8/2002 | Overy et al. |
| 6,561,476 | B2 | 5/2003 | Carnevali |
| 6,565,363 | B2 | 5/2003 | Downing |
| 6,572,176 | B2 | 6/2003 | Davies et al. |
| 6,585,212 | B2 | 7/2003 | Carnevali |
| 6,588,637 | B2 | 7/2003 | Gates et al. |
| 6,597,924 | B1 | 7/2003 | Smith |
| 6,614,423 | B1 | 9/2003 | Wong et al. |
| 6,646,864 | B2 | 11/2003 | Richardson |
| 6,648,376 | B2 | 11/2003 | Christianson |
| 6,687,516 | B2 | 2/2004 | Chen |
| 6,702,604 | B1 | 3/2004 | Moscovitch |
| 6,714,802 | B1 | 3/2004 | Barvesten |
| 6,754,343 | B2 | 6/2004 | Lundstrom et al. |
| 6,762,585 | B2 | 7/2004 | Liao |
| 6,776,422 | B1 | 8/2004 | Toy |
| 6,785,566 | B1 | 8/2004 | Irizarry |
| 6,785,567 | B2 | 8/2004 | Kato |
| 6,816,713 | B2 | 11/2004 | Chen |
| 6,842,171 | B2 | 1/2005 | Richter et al. |
| 6,953,126 | B2 | 10/2005 | Parker et al. |
| 6,984,680 | B2 | 1/2006 | Quinn |
| 6,995,976 | B2 | 2/2006 | Richardson |
| 7,017,243 | B2 | 3/2006 | Carnevali |
| 7,031,148 | B1 | 4/2006 | Lin |
| 7,054,042 | B2 | 5/2006 | Holmes et al. |
| 7,068,783 | B2 | 6/2006 | Peiker |
| 7,158,376 | B2 | 1/2007 | Richardson et al. |
| 7,180,735 | B2 | 2/2007 | Thomas et al. |
| 7,203,058 | B2 | 4/2007 | Hong |
| 7,230,823 | B2 | 6/2007 | Richardson et al. |
| 7,236,356 | B2 | 6/2007 | Ulla et al. |
| 7,248,901 | B2 | 7/2007 | Peiker |
| 7,257,429 | B2 | 8/2007 | Kogan |
| 7,283,849 | B2 | 10/2007 | Peiker |
| 7,311,526 | B2 | 12/2007 | Rohrbach et al. |
| 7,312,984 | B2 | 12/2007 | Richardson et al. |
| 7,320,450 | B2 | 1/2008 | Carnevali |
| 7,329,128 | B1 | 2/2008 | Awad |
| 7,351,066 | B2 | 4/2008 | DiFonzo et al. |
| 7,430,674 | B2 | 9/2008 | von Mueller et al. |
| 7,464,814 | B2 | 12/2008 | Carnevali |
| 7,480,138 | B2 | 1/2009 | Kogan et al. |
| 7,481,664 | B1 | 1/2009 | Knoll et al. |
| 7,517,222 | B2 | 4/2009 | Rohrbach et al. |
| 7,520,389 | B2 | 4/2009 | Lalouette |
| 7,551,458 | B2 | 6/2009 | Carnevali |
| 7,566,224 | B2 | 7/2009 | Wu |
| 7,573,706 | B2 | 8/2009 | Carnevali |
| 7,594,576 | B2 | 9/2009 | Chen et al. |
| 7,609,512 | B2 | 10/2009 | Richardson et al. |
| 7,612,997 | B1 | 11/2009 | Diebel et al. |
| 7,625,212 | B2 | 12/2009 | Du |
| 7,641,477 | B2 | 1/2010 | DiFonzo et al. |
| 7,645,143 | B2 | 1/2010 | Rohrbach et al. |
| 7,663,879 | B2 | 2/2010 | Richardson et al. |
| 7,688,580 | B2 | 3/2010 | Richardson et al. |
| 7,775,801 | B2 | 8/2010 | Shiff et al. |
| 7,782,610 | B2 | 8/2010 | Diebel et al. |
| 7,812,567 | B2 | 10/2010 | Shen |
| 7,841,776 | B2 | 11/2010 | DiFonzo et al. |
| 7,850,032 | B2 | 12/2010 | Carnevali et al. |
| 7,855,529 | B2 | 12/2010 | Liu |
| RE42,060 | E | 1/2011 | Carnevali |
| 7,889,489 | B2 | 2/2011 | Richardson et al. |
| 7,889,498 | B2 | 2/2011 | Diebel et al. |
| 7,894,180 | B2 | 2/2011 | Carnevali |
| 7,901,216 | B2 | 3/2011 | Rohrbach et al. |
| 7,907,394 | B2 | 3/2011 | Richardson et al. |
| 7,911,779 | B1 | 3/2011 | Tarnoff |
| 7,946,868 | B1 | 5/2011 | Chen |
| 7,946,891 | B2 | 5/2011 | Peiker |
| 7,970,440 | B2 | 6/2011 | Bury |
| RE42,581 | E | 8/2011 | Carnevali |
| 7,997,554 | B2 | 8/2011 | Carnevali |
| 8,054,042 | B2 | 11/2011 | Griffin, Jr. et al. |
| 8,061,516 | B2 | 11/2011 | Carnevali |
| 8,062,078 | B2 | 11/2011 | Asai et al. |
| 8,074,951 | B2 | 12/2011 | Carnevali |
| 8,080,975 | B2 | 12/2011 | Bessa et al. |
| 8,087,939 | B2 | 1/2012 | Rohrbach et al. |
| 8,099,138 | B2 | 1/2012 | Piekarz |
| 8,167,624 | B2 | 5/2012 | Hartlef et al. |
| 8,172,580 | B1 | 5/2012 | Chen et al. |
| 8,177,178 | B2 | 5/2012 | Carnevaali |
| 8,177,560 | B2 | 5/2012 | Rohrbach et al. |

(56) References Cited

U.S. PATENT DOCUMENTS 8,179,672 B2 5/2012 Carnevali
8,183,825 B2 5/2012 Sa
8,224,408 B2 7/2012 Tomasini et al.
8,295,043 B2 10/2012 Tai et al.
RE43,806 E 11/2012 Carnevali
8,367,235 B2 2/2013 Huang
8,390,255 B1 3/2013 Fathollahi
8,405,974 B2 3/2013 Sayavong
8,414,312 B2 4/2013 Hung et al.
8,430,240 B2 4/2013 Kim
8,435,042 B2 5/2013 Rohrbach et al.
8,453,835 B2 6/2013 So
8,454,178 B2 6/2013 Carnevali
8,457,701 B2 6/2013 Diebel
8,483,758 B2 7/2013 Huang
8,497,753 B2 7/2013 DiFonzo et al.
8,505,861 B2 8/2013 Carnevali
8,531,833 B2 9/2013 Diebel et al.
8,553,408 B2 10/2013 Supran et al.
8,560,014 B1 10/2013 Hu et al.
8,634,887 B2 1/2014 Hu et al.
8,639,288 B1 1/2014 Friedman
8,646,698 B2 2/2014 Chen et al.
8,675,359 B2 3/2014 Chen
8,690,582 B2 4/2014 Rohrbach et al.
8,702,316 B2 4/2014 DiFonzo et al.
8,729,854 B2 5/2014 Tsai et al.
8,760,311 B2 6/2014 Heaton
8,763,802 B2 7/2014 Ellis-Brown
8,801,441 B2 8/2014 Zhang et al.
8,825,123 B1 9/2014 Gudino
8,833,716 B2 9/2014 Funk et al.
8,844,817 B2 9/2014 Glanzer et al.
8,873,233 B2 10/2014 Reber et al.
D718,293 S 11/2014 Namminga
8,891,800 B1 11/2014 Shaffer
8,894,420 B2 11/2014 Schichl et al.
8,907,783 B2 12/2014 Fish et al.
8,911,246 B2 12/2014 Carnevali
8,917,506 B2 12/2014 Diebel et al.
8,929,065 B2 1/2015 Williams
8,931,748 B2 * 1/2015 Bowman .............. F16M 13/022 248/917
8,950,717 B2 2/2015 Chuang
8,970,332 B2 3/2015 DiFonzo et al.
9,007,758 B2 4/2015 Wilson et al.
9,011,184 B2 4/2015 Chen et al.
9,019,698 B2 4/2015 Thiers
9,026,187 B2 5/2015 Huang
9,036,343 B2 5/2015 Carnevali
9,071,060 B2 6/2015 Fathollahi
9,072,172 B2 6/2015 Hsu
9,077,794 B2 7/2015 Narendra et al.
9,089,059 B1 7/2015 Haskin et al.
9,112,304 B2 8/2015 Rohrbach et al.
9,123,935 B2 9/2015 Huang
9,147,966 B2 9/2015 An
9,172,781 B1 10/2015 Goldstein
9,195,279 B2 11/2015 Carnevali et al.
9,201,593 B2 12/2015 Collopy et al.
9,229,494 B2 1/2016 Rayner
9,288,295 B2 3/2016 Ivanovski et al.
9,298,661 B2 3/2016 Hamel et al.
9,300,078 B2 3/2016 Liu et al.
9,300,081 B2 3/2016 Rudisill et al.
9,331,444 B2 5/2016 Carnevali
9,356,267 B1 5/2016 To et al.
9,495,375 B2 11/2016 Huang et al.
9,529,387 B2 12/2016 Carnevali
9,535,457 B1 1/2017 Vier
9,567,776 B2 2/2017 Moock et al.
9,591,113 B2 3/2017 Filser et al.
9,602,639 B2 3/2017 Carnevali
9,632,535 B2 4/2017 Carnevali et al.
9,647,474 B2 5/2017 Fathollahi et al.
9,706,026 B2 7/2017 Carnevali
9,742,885 B2 8/2017 Rostami
9,748,535 B2 8/2017 Huang et al.
9,760,116 B2 9/2017 Wylie
9,762,013 B2 9/2017 George et al.
9,774,713 B2 9/2017 Guerdrum et al.
9,776,577 B2 10/2017 Carnevali
9,807,211 B2 10/2017 Guerdrum et al.
9,809,175 B2 11/2017 Jonik et al.
9,817,441 B1 11/2017 Kuo
9,831,904 B1 11/2017 Carnevali
9,898,041 B2 2/2018 Blowers et al.
9,924,005 B1 3/2018 McElderry
9,939,850 B2 4/2018 Hoellwarth et al.
10,033,204 B2 7/2018 Huang et al.
10,050,658 B2 8/2018 Carnevali
10,054,984 B2 8/2018 Carnevali et al.
10,148,104 B2 12/2018 Sa
10,170,738 B2 1/2019 Huang et al.
10,172,246 B2 1/2019 Apter
10,330,251 B2 6/2019 Carnevali
10,389,399 B2 8/2019 Carnevali
10,401,905 B2 9/2019 Carnevali
10,416,715 B1 9/2019 Wade et al.
10,436,244 B2 * 10/2019 Hung ..................... F16M 11/24
10,454,515 B2 10/2019 Carnevali
10,485,312 B2 11/2019 Rodriguez
10,516,431 B2 12/2019 DiLella
10,548,380 B2 2/2020 Rayner et al.
10,559,788 B2 2/2020 Huang et al.
10,630,334 B2 4/2020 Carnevali
10,656,687 B2 5/2020 Tashiro et al.
10,666,309 B2 5/2020 Carnevali
10,707,632 B1 7/2020 Yamamoto et al.
10,714,953 B1 7/2020 Solana et al.
10,778,275 B2 9/2020 Carnevali
10,788,857 B2 9/2020 Huang et al.
10,812,643 B1 10/2020 Carnevali et al.
D903,685 S 12/2020 Wright et al.
10,928,856 B1 2/2021 Hamlin et al.
D915,373 S 4/2021 Zhou
10,976,777 B2 4/2021 Pischel
11,029,731 B1 6/2021 Carnevali
D924,863 S 7/2021 Wright et al.
11,076,032 B1 7/2021 Carnevali
11,165,458 B2 11/2021 Carnevali
11,277,506 B2 3/2022 Carnevali
11,289,864 B2 3/2022 Carnevali et al.
11,489,350 B2 11/2022 Carnevali
11,522,379 B2 12/2022 Lee et al.
11,597,334 B2 3/2023 Telesco et al.
11,619,971 B1 4/2023 Passe et al.
11,622,032 B2 4/2023 Wright et al.
11,652,326 B2 5/2023 Carnevali
12,126,199 B2 10/2024 Carnevali et al.
12,132,511 B2 10/2024 Carnevali
D1,052,884 S 12/2024 Hong
2002/0009194 A1 1/2002 Wong et al.
2002/0032041 A1 3/2002 Hirai et al.
2002/0136557 A1 9/2002 Shimamura
2002/0191782 A1 12/2002 Beger et al.
2002/0193136 A1 12/2002 Halkosaari et al.
2003/0068986 A1 4/2003 Oh
2003/0116631 A1 6/2003 Salvato et al.
2003/0218445 A1 11/2003 Behar
2004/0108348 A1 6/2004 Barnes
2004/0209489 A1 10/2004 Clapper
2005/0189354 A1 9/2005 Heather et al.
2005/0238422 A1 * 10/2005 Hung ...................... F16B 7/042 403/379.4
2006/0058073 A1 3/2006 Kim
2006/0175766 A1 8/2006 Carnevali
2007/0127204 A1 6/2007 Muenzer et al.
2007/0261978 A1 11/2007 Sanderson
2008/0053770 A1 3/2008 Tynyk
2008/0104301 A1 5/2008 Assouad et al.
2008/0149796 A1 6/2008 Moscovitch
2008/0273734 A1 11/2008 Solland
2008/0320190 A1 12/2008 Lydon et al.

(56) References Cited

U.S. PATENT DOCUMENTS

| | | | |
|---|---|---|---|
| 2009/0021903 | A1 | 1/2009 | Chen et al. |
| 2009/0140113 | A1 | 6/2009 | Carnevali |
| 2009/0160400 | A1 | 6/2009 | Woud |
| 2009/0314400 | A1 | 12/2009 | Liu |
| 2010/0013431 | A1 | 1/2010 | Liu |
| 2010/0078343 | A1 | 4/2010 | Hoellwarth et al. |
| 2011/0122565 | A1 | 5/2011 | Liu |
| 2011/0134601 | A1 | 6/2011 | Sa |
| 2011/0159324 | A1 | 6/2011 | Huang et al. |
| 2011/0287726 | A1 | 11/2011 | Huang |
| 2011/0299238 | A1 | 12/2011 | Radin et al. |
| 2012/0018325 | A1 | 1/2012 | Kim |
| 2012/0043235 | A1 | 2/2012 | Klement |
| 2012/0088558 | A1 | 4/2012 | Song |
| 2012/0118773 | A1 | 5/2012 | Rayner |
| 2012/0161706 | A1 | 6/2012 | Zhou |
| 2012/0211382 | A1 | 8/2012 | Rayner |
| 2012/0250270 | A1 | 10/2012 | Liu |
| 2012/0261306 | A1 | 10/2012 | Richardson et al. |
| 2012/0298536 | A1 | 11/2012 | Rauta et al. |
| 2012/0303520 | A1 | 11/2012 | Huang |
| 2013/0002193 | A1 | 1/2013 | Aldana et al. |
| 2013/0023313 | A1 | 1/2013 | Kim |
| 2013/0088188 | A1 | 4/2013 | Romanenko |
| 2013/0092576 | A1 | 4/2013 | Rayner |
| 2013/0106353 | A1 | 5/2013 | Foster |
| 2013/0193006 | A1 | 8/2013 | Bergreen et al. |
| 2013/0220841 | A1 | 8/2013 | Yang |
| 2013/0222991 | A1 | 8/2013 | McWilliams |
| 2013/0258573 | A1 | 10/2013 | Muday et al. |
| 2013/0273752 | A1 | 10/2013 | Rudisill et al. |
| 2013/0273983 | A1 | 10/2013 | Hsu |
| 2013/0300267 | A1 | 11/2013 | Richardson et al. |
| 2013/0322568 | A1 | 12/2013 | Pais et al. |
| 2013/0331156 | A1 | 12/2013 | Lui |
| 2013/0334071 | A1 | 12/2013 | Carnevali |
| 2014/0035511 | A1 | 2/2014 | Ferber et al. |
| 2014/0036420 | A1 | 2/2014 | Chen |
| 2014/0042285 | A1 | 2/2014 | Carnevali |
| 2014/0055928 | A1 | 2/2014 | Lee |
| 2014/0059264 | A1 | 2/2014 | Sudak |
| 2014/0065948 | A1 | 3/2014 | Huang |
| 2014/0066144 | A1 | 3/2014 | Hong |
| 2014/0070774 | A1 | 3/2014 | Terlizzi et al. |
| 2014/0099526 | A1 | 4/2014 | Powell et al. |
| 2014/0168885 | A1 | 6/2014 | Williams |
| 2014/0307376 | A1 | 10/2014 | Lee |
| 2014/0347000 | A1 | 11/2014 | Hamann et al. |
| 2014/0363988 | A1 | 12/2014 | An |
| 2015/0011099 | A1 | 1/2015 | Kim et al. |
| 2015/0055289 | A1 | 2/2015 | Chang et al. |
| 2015/0098184 | A1 | 4/2015 | Tsai et al. |
| 2015/0146401 | A1 | 5/2015 | Su et al. |
| 2015/0189780 | A1 | 7/2015 | Su et al. |
| 2015/0270861 | A1 | 9/2015 | Lin et al. |
| 2016/0065702 | A1 | 3/2016 | Carnevali |
| 2016/0231779 | A1 | 8/2016 | Kaneko et al. |
| 2016/0309010 | A1 | 10/2016 | Carnevali |
| 2017/0054312 | A1 | 2/2017 | Kuchynka et al. |
| 2017/0227987 | A1 | 8/2017 | Carnevali et al. |
| 2018/0279809 | A1 | 10/2018 | Regan et al. |
| 2018/0314296 | A1 | 11/2018 | Evns, V et al. |
| 2019/0267825 | A1 | 8/2019 | Chien |
| 2020/0195763 | A1 | 6/2020 | Ellis |
| 2020/0197563 | A1 | 6/2020 | Shen et al. |
| 2020/0326955 | A1 | 10/2020 | Adiletta et al. |
| 2020/0330037 | A1 | 10/2020 | Al-Ali et al. |
| 2020/0371555 | A1 | 11/2020 | Huang et al. |
| 2021/0048848 | A1 | 2/2021 | Pischel |
| 2021/0194256 | A1 | 6/2021 | Carnevali |
| 2021/0391678 | A1 | 12/2021 | Carnevali |
| 2021/0392773 | A1 | 12/2021 | Carnevali |
| 2022/0026951 | A1 | 1/2022 | Wood, III et al. |
| 2022/0066505 | A1 | 3/2022 | Lu et al. |
| 2022/0253097 | A1 | 8/2022 | Carnevali et al. |
| 2022/0352682 | A1 | 11/2022 | Carnevali |
| 2023/0039167 | A1 | 2/2023 | Kamepalli et al. |
| 2023/0045485 | A1 | 2/2023 | Carnevali et al. |
| 2023/0341897 | A1 | 10/2023 | Carnevali et al. |
| 2024/0361803 | A1 | 10/2024 | Carnevali et al. |
| 2024/0399976 | A1 | 12/2024 | Carnevali et al. |
| 2024/0403251 | A1 | 12/2024 | Anderson |
| 2025/0013262 | A1 | 1/2025 | Carnevali et al. |
| 2025/0053196 | A1 | 2/2025 | Carnevali |
| 2025/0224768 | A1 | 7/2025 | Carnevali |
| 2025/0226846 | A1 | 7/2025 | Carnevali |

FOREIGN PATENT DOCUMENTS

| | | |
|---|---|---|
| CN | 202268924 | 6/2012 |
| CN | 202565335 | 11/2012 |
| CN | 204334055 | 5/2015 |
| CN | 204334674 | 5/2015 |
| CN | 204408423 | 6/2015 |
| JP | 2004-349969 | 12/2004 |
| JP | 2014-75327 | 4/2014 |
| KR | 20-0265673 | 2/2002 |
| KR | 10-1078214 | 11/2011 |
| KR | 101609754 B1 | 4/2016 |
| TW | 2003TW531119 | 5/2003 |
| TW | M422808 | 2/2012 |
| WO | 2012/052751 | 4/2012 |
| WO | 2013/081222 | 6/2013 |
| WO | 2014/010781 | 1/2014 |
| WO | WO 2014/010781 A1 | 1/2014 |
| WO | 2014/054426 | 4/2014 |
| WO | WO2014145748 A1 | 9/2014 |
| WO | 2015/022675 | 2/2015 |

OTHER PUBLICATIONS

Officeonthego.com, 3 pages of product description of Magnifico ® Plus screen magnifier product information retrieved from web site at: www.officeonthego.com.

2 pages of product information for Armor 1600 and Armor 1601 waterproof, dustproof and airtight protective cases.

2 pages Otterox 4600 Tablet PC Case protective cases product information retrieved from web site at: www.otterbox.com.

Jason Poel Smith: "How to Transplant RFID Chips", Sep. 3, 2013 (Sep. 3, 2013), XP55492991, Retrieved from the Internet: URL: http://www.instructables.com/id/How-to-Transplant-RFID-Chips/ [retrieved on Jul. 17, 2018].

Battery Charging Specification (Including errata and ECNs through Mar. 15, 2012); Revision 1.2, Mar. 15, 2012. 72 pages.

U.S. Appl. No. 18/590,837, filed Feb. 28, 2024.

U.S. Appl. No. 18/612,977, filed Mar. 21, 2024.

U.S. Appl. No. 18/404,795, filed Jan. 4, 2024.

U.S. Appl. No. 18/614,482, filed Mar. 22, 2024.

U.S. Appl. No. 18/638,430, filed Apr. 17, 2024.

MC40 Integrator Guide, Motorola Solutions, Inc., Oct. 4, 2013.

Various documents for iPort LaunchPort Product, alleged to have been available as early as 2013.

Juice Pack System Air Manual—Juice Pack System Air alleged to have been available as early as Feb. 6, 2013.

Juice Pack System Press Releases dated Jun. 14, 2011; Jun. 19, 2012; and Feb. 6, 2013.

Juice Pack System Dock Manual—Juice Pack System Dock alleged to have been available as early as Feb. 6, 2013.

Juice Pack System images—Juice Pack System alleged to have been available as early as Feb. 6, 2013.

Juice Pack System Helium Manual—Juice Pack System Helium alleged to have been available as early as Feb. 6, 2013.

Juice Pack System Add-Ons—Juice Pack System alleged to have been available as early as Feb. 6, 2013.

Juice Pack System Plus iPhone 6 Manual—Juice Pack System Plus alleged to have been available as early as Feb. 6, 2013.

Juice Pack System Dock Page IA—Juice Pack System Dock alleged to have been available as early as Feb. 6, 2013.

(56) References Cited

OTHER PUBLICATIONS

Wildcharge System reviews—Wildcharge System alleged to have been available as early as Mar. 23, 2008.
Wildcharge System articles dated Mar. 23, 2008; Jun. 23, 2009; and Sep. 2009.
Wildcharge System webpages—Wildcharge System alleged to have been available as early as Mar. 23, 2008 and these webpages alllegedly are from 2009 and 2010.
Wildcharge System Press Release from Nov. 13, 2007.
Wildcharge System WildCharge Wire Free Power alleged to have been available as early as Mar. 23, 2008.
Wildcharge System WildCharge Skin for iPhone alleged to have been available as early as Mar. 23, 2008.
Wildcharge System images—Wildcharge System alleged to have been available as early as Mar. 23, 2008.

* cited by examiner

PEDESTAL MOUNTS AND DOCKS FOR MOBILE DEVICES AND METHODS OF MAKING AND USING

FIELD

The present invention is directed to mounts for a mobile device. The present invention is also directed to mounts with or without docks for a mobile device.

BACKGROUND

Mobile devices, such as smartphones, cellular or mobile phones, tablets, personal data assistants, and other portable devices, are now ubiquitous. Mounts and cradles can be used to protect the mobile device, to mount the mobile device onto a surface or object, or to provide power, or data to or from, the mobile device, or any combination thereof.

BRIEF SUMMARY

One embodiment is a mount for a mobile device. The mount includes a dock configured for coupling to the mobile device; a mounting arm coupled to the dock; an axle coupled to the mounting arm and configured for rotation of the dock about the axle; a first tube arrangement including a first tube and at least a pair of axle posts extending from the first tube, wherein each of the axle posts defines an axle opening for receiving the axle with a portion of the mounting arm disposed around the axle and between the axle posts; a second tube arrangement including a base and a second tube extending from the base; and a lever disposed along a first one of the first tube or the second tube, wherein the lever includes a first end portion with a lever post disposed along the first end portion, a second end portion opposite the first end portion, and at least one fulcrum arm coupled to the first one of the first tube or the second tube and disposed between the first end portion and the second end portion of the lever; wherein a second one of the first tube or the second tube defines a first cutout extending around at least 50% of a circumference of the second one of the first tube or the second tube, wherein the first cutout is configured to receive the lever post and permit travel of the lever post along the first cutout; wherein the first one of the first tube or the second tube is configured for insertion into the second one of the first tube or the second tube to receive the lever post in the first cutout, wherein the second one of the first tube or the second tube is configured to engage the second end portion of the lever to bias the lever post outward into the first cutout, wherein the mount is configured for the dock to be rotatable, relative to the base of the second tube arrangement, about two different axes when the lever post is received in the first cutout.

In at least some embodiments, the second one of the first tube or second tube further defines a second cutout configured to receive and hold the lever post at a selected position along the circumference of the second one of the first tube or the second tube, wherein the mount is configured for the dock to be rotatable, relative to the base of the second tube arrangement, about one axis when the lever post is received in the second cutout.

In at least some embodiments, the dock defines a docking button indentation configured to receive a docking button disposed on, or coupled to, a back surface of the mobile device or of a case containing the mobile device. In at least some embodiments, the dock includes a cradle configured for receiving the mobile device.

In at least some embodiments, the mount further includes a cover configured to cover at least a portion of the second tube arrangement. In at least some embodiments, the cover defines an opening configured for accessing the lever post of the lever through the cover when the lever post is rotated to align with the opening.

In at least some embodiments, the axle includes a first portion and a second portion, wherein the first portion receives a part of the second portion to form the axle. In at least some embodiments, the mount further includes a cable extendable through a portion of the mount for coupling the mobile device to a power or data source.

Another embodiment is a mount for a mobile device. The mount includes a mounting arm configured for coupling a dock thereto; an axle coupled to the mounting arm and configured for rotation about the axle; a first tube arrangement including a first tube and at least a pair of axle posts extending from the first tube, wherein each of the axle posts defines an axle opening for receiving the axle with a portion of the mounting arm disposed around the axle and between the axle posts; a second tube arrangement including a base and a second tube extending from the base; and a lever disposed along a first one of the first tube or the second tube, wherein the lever includes a first end portion with a lever post disposed along the first end portion, a second end portion opposite the first end portion, and at least one fulcrum arm coupled to the first one of the first tube or the second tube and disposed between the first end portion and the second end portion of the lever; wherein a second one of the first tube or the second tube defines a first cutout extending around at least 50% of a circumference of the second one of the first tube or the second tube, wherein the first cutout is configured to receive the lever post and permit travel of the lever post along the first cutout; wherein the first one of the first tube or the second tube is configured for insertion into the second one of the first tube or the second tube to receive the lever post in the first cutout, wherein the second one of the first tube or the second tube is configured to engage the second end portion of the lever to bias the lever post outward into the first cutout, wherein the mount is configured for the dock, when coupled thereto, to be rotatable, relative to the base of the second tube arrangement, about two different axes when the lever post is received in the first cutout.

In at least some embodiments, the mount further includes the dock configured for coupling to the mobile device, wherein the dock is removably coupled or coupleable to the mounting arm. In at least some embodiments, the dock defines a docking button indentation configured to receive a docking button disposed on, or coupled to, a back surface of the mobile device or of a case containing the mobile device. In at least some embodiments, the dock includes a cradle configured for receiving the mobile device.

In at least some embodiments, the second one of the first tube or second tube further defines a second cutout configured to receive and hold the lever post at a selected position along the circumference of the second one of the first tube or the second tube, wherein the mount is configured for the dock, when coupled thereto, to be rotatable, relative to the base of the second tube arrangement, about one axis when the post is received in the second cutout.

In at least some embodiments, the mount further includes a cover configured to cover at least a portion of the second tube arrangement. In at least some embodiments, the cover defines an opening configured for accessing the lever post of the lever through the cover when the lever post is rotated to align with the opening.

In at least some embodiments, the axle includes a first portion and a second portion, wherein the first portion receives a part of the second portion to form the axle. In at least some embodiments, the mount further includes a cable extendable through a portion of the mount for coupling the mobile device to a power or data source.

Yet another embodiments is a system that includes any of the mounts described above, as well as the mobile device.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

Figure 1A:
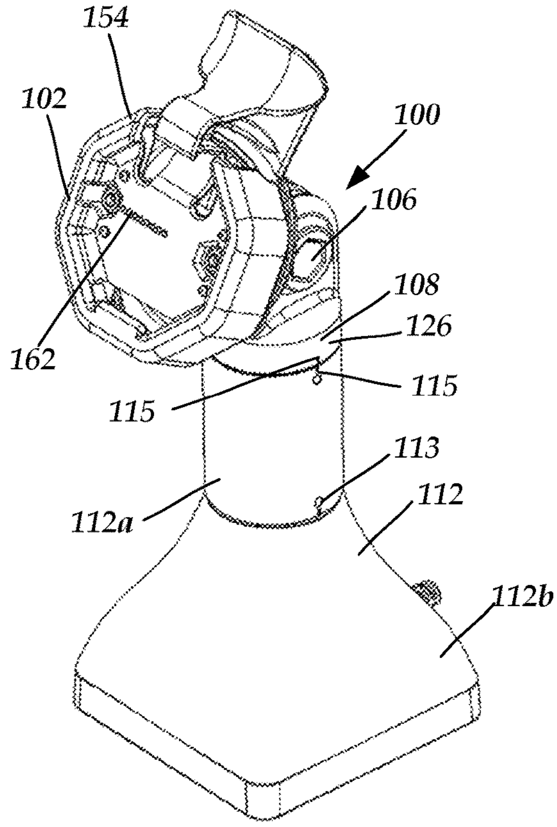
FIG. 1A is a schematic perspective side view of one embodiment of a mount for a mobile device, according to the invention.

The present invention is directed to mounts for a mobile device. The present invention is also directed to mounts with or without docks for a mobile device.

FIGS. 1A to 1E and FIG. 2 illustrate embodiments of a mount 100 for a mobile device 180 (FIG. 4A), such as a cellular or mobile phone, a smartphone, a tablet, a personal data assistant, or any other suitable mobile device. The mount 100 includes an optional dock 102, a mounting arm 104, an axle 106, a first tube arrangement 108, a second tube arrangement 110 (FIG. 1D), and an optional cover 112. The optional dock 102, mounting arm 104, axle 106, first tube arrangement 108, second tube arrangement 110 (FIG. 1D), and optional cover 112 can be made of any suitable material including, but not limited to, plastic (such as rigid plastic), metal, or the like or any combination thereof. Different components can be made of the same or different material or combination of materials.

In at least some embodiments, the mount 100 includes a dock 102, which can be any suitable dock for a mobile device including, but not limited to, a cradle (FIG. 2) or a docking button receiver (FIG. 1A). In other embodiments, the mount 100 does not include the dock 102 and the dock can be provided separately and attached to the mount. Non-limiting examples of docks (e.g., cradles) that can be part of the mount 100 are described in U.S. Pat. Nos. 9,831,904; 11,029,731; 11,076,032; 11,277,506; 11,289,864; 11,489,350; and 12,126,199; U.S. Patent Application Publication No. 2024/0361803; and U.S. patent application Ser. Nos. 18/590,837 and 18/621,977, all of which are incorporated herein by reference in their entireties. Additional examples of docks 102 are described below. Any other suitable dock 102 can be used.

Figure 1B:
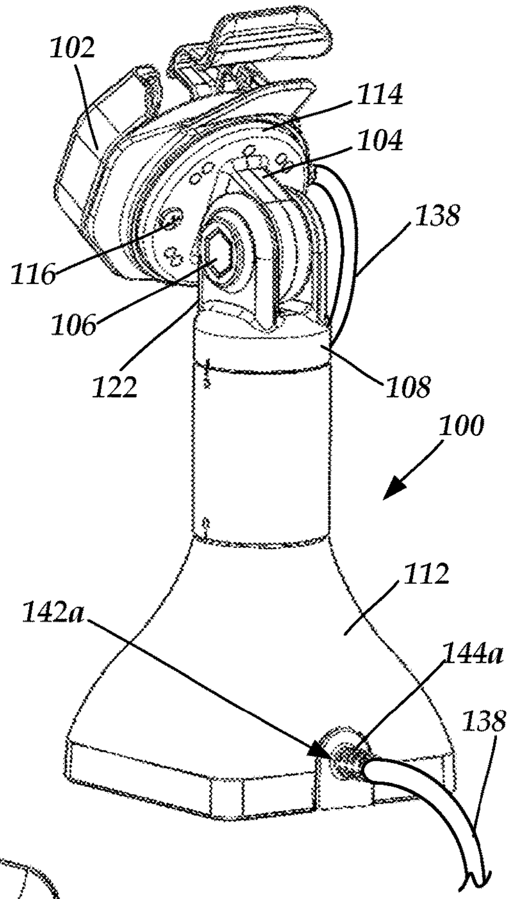
FIG. 1B is a schematic perspective side view of the mount of FIG. 1A from another angle, according to the invention.

The mounting arm 104 is coupled or coupleable to the dock 102. In at least some embodiments, the mounting arm 104 is part of the dock 102. In other embodiments, the mounting arm 104 is attached or attachable to the dock 102 and may be directly attached or attachable to the dock. In at least some embodiments, the mounting arm 104 is attached to an optional dock mount base 114 that is attached or attachable (directly or indirectly) to the dock 102 using one or more fasteners 116, as illustrated in FIG. 1B. The dock mount base 114 can be a plate or the like or can be a mounting ball or any other suitable arrangement for attachment of the dock 102 to the mount 100. Non-limiting examples of dock mount bases can be found at U.S. Pat. Nos. 5,845,885; 6,561,476; 7,320,50; 7,997,554; 8,454,178; 8,505,861; 9,831,904; RE 42,060; RE 42,581; and RE43,806, all of which are incorporated herein by reference in their entireties. The illustrated embodiments have a single mounting arm. It will be understood that multiple mounting arms 104 can be used.

Figure 1C:
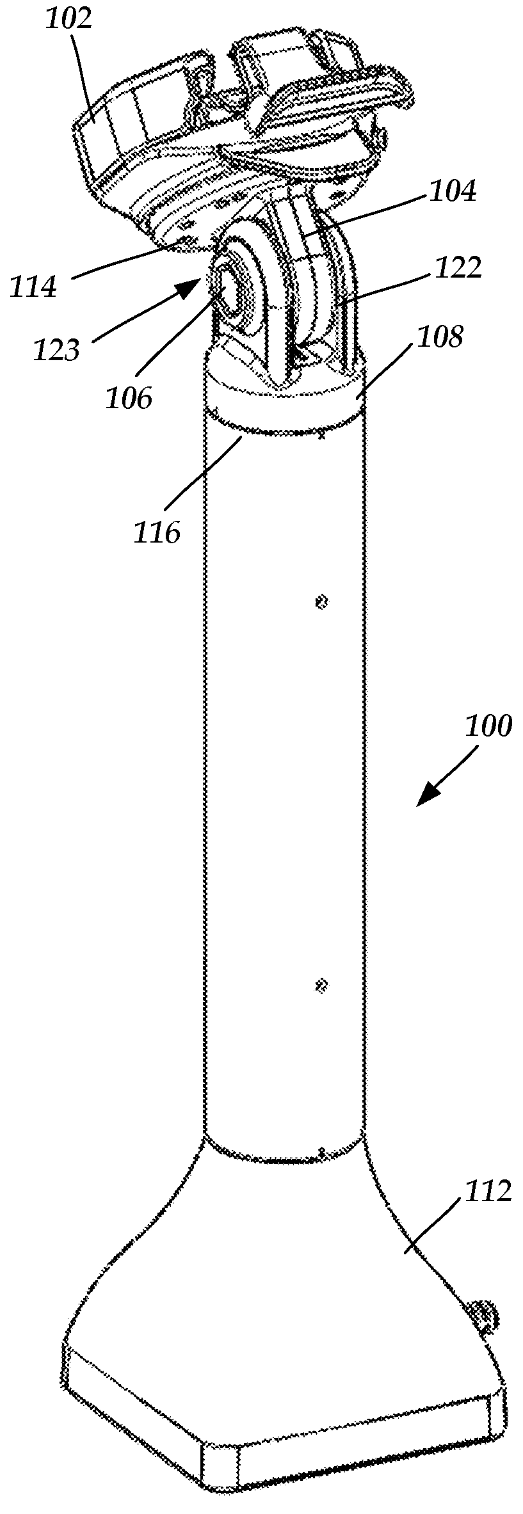
FIG. 1C is a schematic perspective side view of another embodiment of a mount for a mobile device, according to the invention.
Figure 1D:
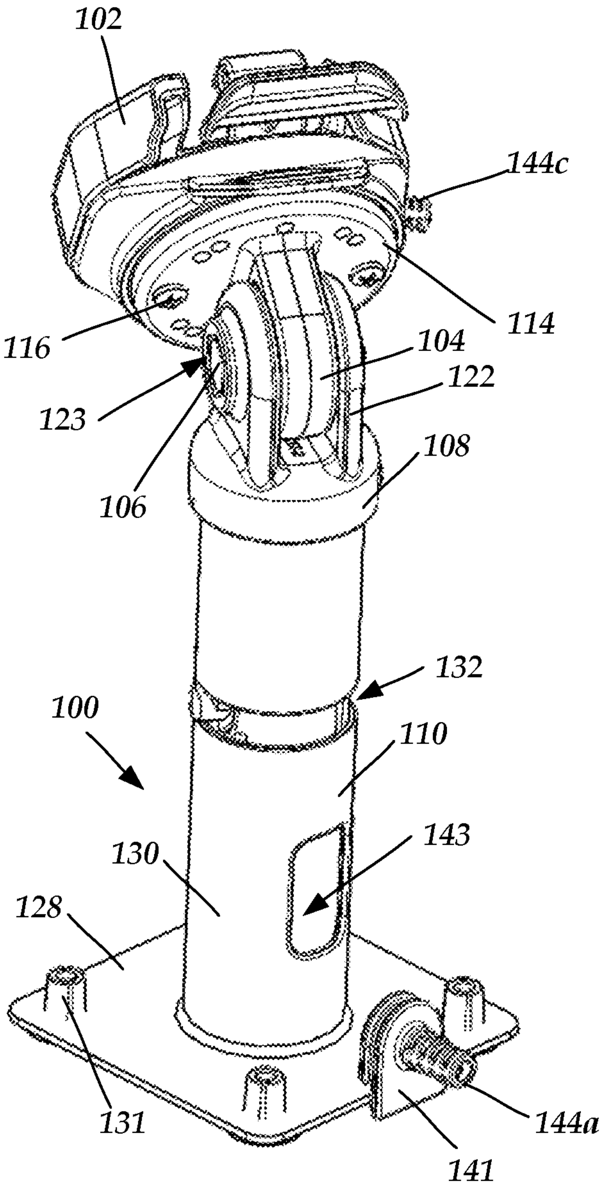
FIG. 1D is a schematic perspective side view of the mount of FIG. 1A with the cover removed, according to the invention.
Figure 1E:
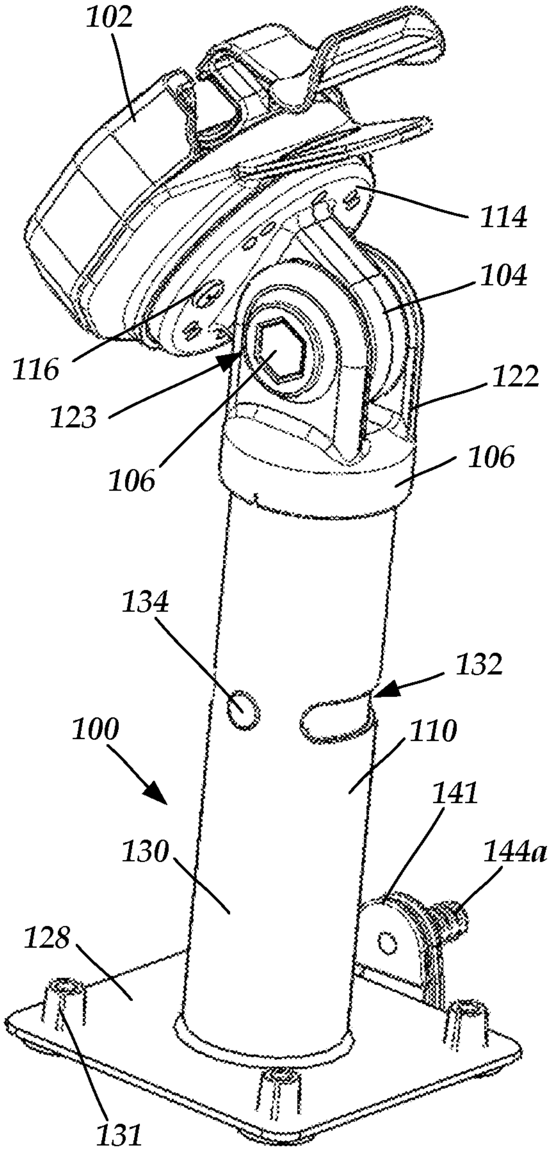
FIG. 1E is a schematic perspective side view of the mount of FIG. 1A with the cover removed from a different angle, according to the invention.
Figure 1F:
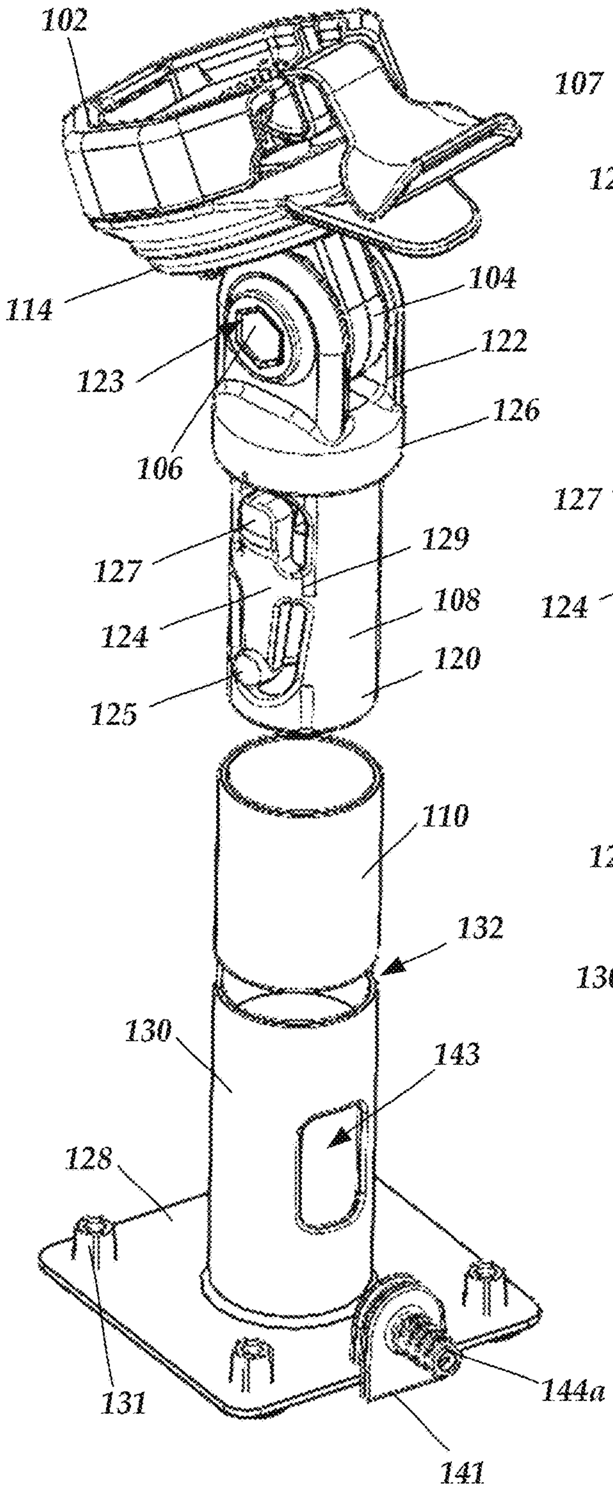
FIG. 1F is a schematic perspective side view of the mount of FIG. 1A with the cover removed and the first and second tube arrangements separated, according to the invention.

In at least some embodiments, as illustrated in FIG. 1F, the first tube arrangement 108 includes a first tube 120, one or more axle posts 122, a lever 124, and an optional cap 126. The axle post(s) 122 extend from the first tube 120 or from the cap 126 disposed on an end of the first tube, as illustrated in FIG. 1F. The illustrated embodiment includes two axle posts 122 but any suitable number of axle posts can be used, such as one, two, three, four, or more axle posts. Each axle post 122 has an opening 123 through which the axle 106 extends or can extend.

Figure 1G:
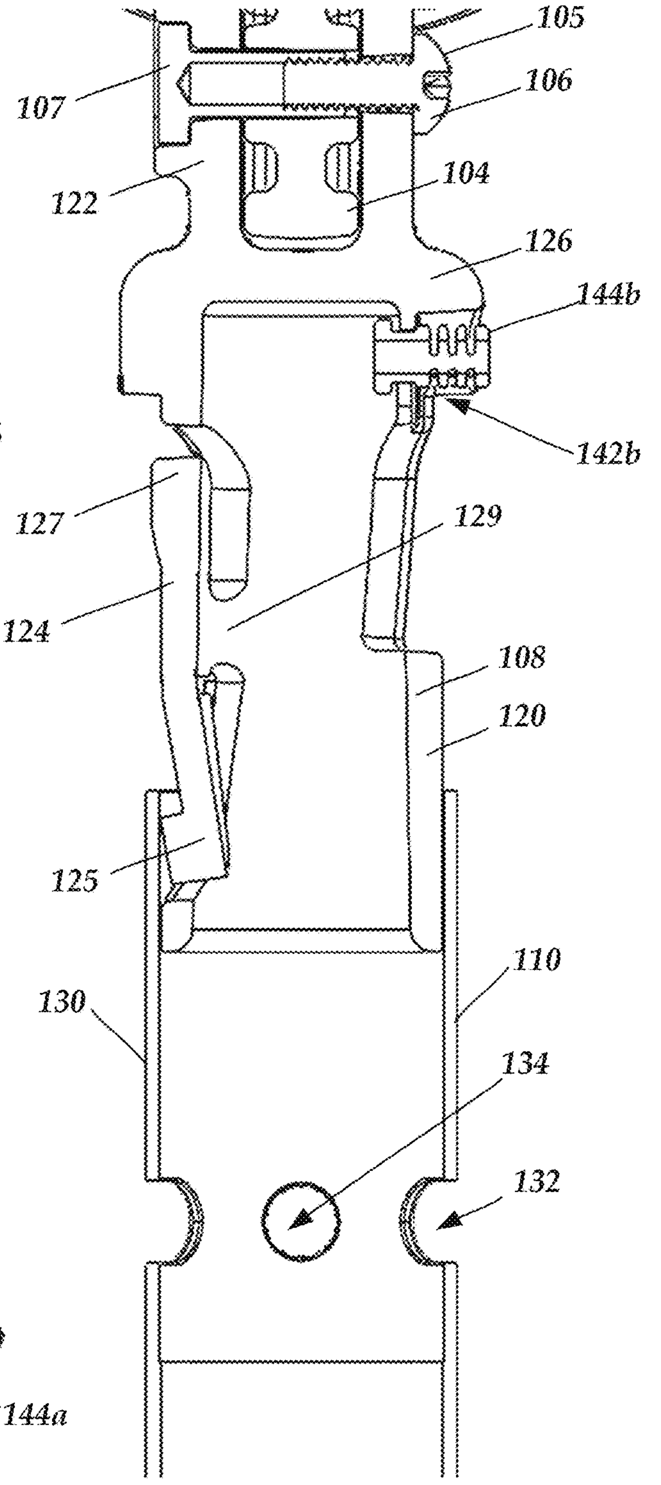
FIG. 1G is a schematic close-up, cross-sectional view of the mount of FIG. 1A with the cover removed, according to the invention.
Figure 1H:
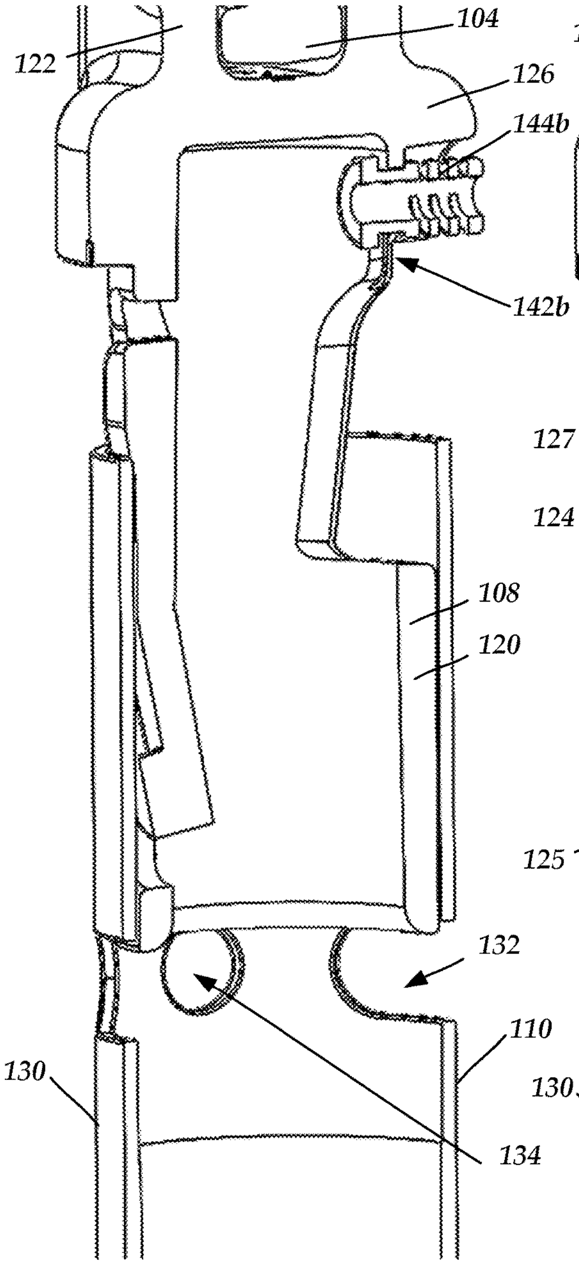
FIG. 1H is a schematic close-up, cross-sectional view of the mount of FIG. 1A with the cover removed and the first tube arrangement partially inserted into the second tube arrangement, according to the invention.
Figure 1I:
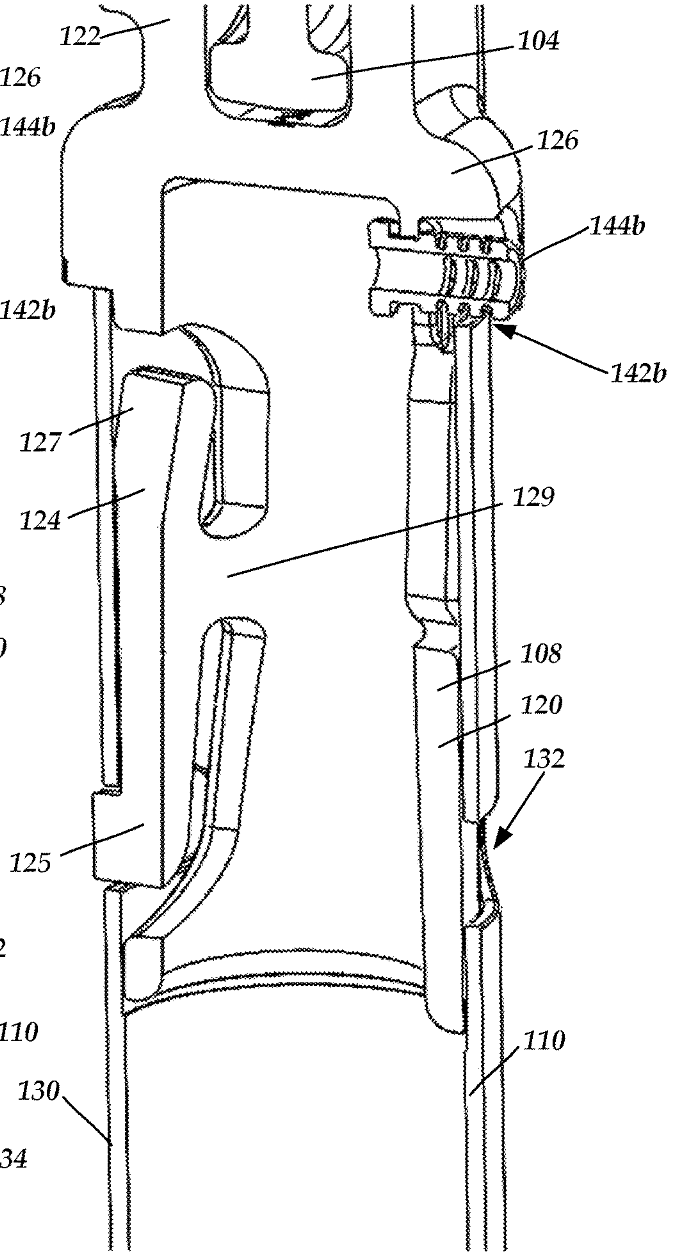
FIG. 1I is a schematic close-up, cross-sectional view of the mount of FIG. 1A with the cover removed and the first tube arrangement fully inserted into the second tube arrangement, according to the invention.

In at least some embodiments, as illustrated in FIG. 1G, the axle 106 includes a first axle part 105 and a second axle part 107. An end of the first axle part 105 can be inserted through an opening 123 in at least one axle post 122 and then inserted into an end of the second axle part 107, which also can be inserted through an opening in at least one additional axle port. In at least some embodiments, an exterior surface of at least a portion of the first axle part 105 and an interior surface of at least a portion of the second axle part 107 are threaded so that the first axle part can be screwed into the second axle part. In at least some other embodiments, the axle 106 includes a shaft and at least one removable axle cap that is attachable to one or both ends of the axle with the axle cap being larger than the opening(s) 123 in the axle post(s) 122.

The mounting arm 104 is disposed around the axle 106 allowing the mounting arm to rotate about the axle. In at least some embodiments, a portion of the mounting arm 104 is disposed between two or more of the axle posts 122, as illustrated in FIG. 1F. This arrangement allows the mounting arm 104 and attached dock 102 to rotate about the axle 106. The range of rotation of the dock 102 about the axle 106 can be limited by the physical components (e.g., second tube arrangement 110 or first tube arrangement 108) of the mount 100. In at least some embodiments, the range of rotation of the dock 102 about the axle 106 can be limited by, for example, the shape of the axle, mounting arm 104, first tube arrangement 108, or the like or any combination thereof. For example, a rotation stop can be positioned or formed on the axle 106, mounting arm 104, first tube arrangement 108, or the like or any combination to limit rotation of the mounting arm about the axle.

The second tube arrangement 110 includes a base 128 and a second tube 130 extending from the base, as illustrated in FIG. 1F. In at least some embodiments, the second tube 130 is permanently attached to the base 128. In other embodiments, the second tube 130 is removably attached or attachable to the base 128. In at least some embodiments, the second tube 130 has an inner diameter larger than an outer diameter of the first tube 120 so that at least a portion of the first tube can be inserted into and received by the second tube 130. In at least some embodiments, the optional cap 126 has a diameter larger than an outer diameter of the second tube 130 and can act as a stop for the insertion of the first tube 120 into the second tube. In at least some embodiments, the base 128 include one or more base openings 131 (FIG. 1D) so that the mount 100 can be attached to a surface, device, or the like using fastener(s).

The lever 124 of the first tube arrangement 108 is disposed along the first tube 120 and includes a lever post 125, an end portion 127 opposite the lever post 125, and one or more fulcrum arms 129 attached to a remainder of the first tube. When the first tube 120 is inserted into the second tube 130, the interior wall of the second tube engages the end portion 127 of the lever 124 to push and bias the lever post 125 outwardly.

The second tube 130 defines at least one first cutout 132 extending around at least 25, 33, 50, 66, 75, 80, or 90% or more of the circumference of the second tube arrangement and is sized to receive the lever post 125 of the lever 124 of the first tube arrangement 108. The at least one first cutout 132 allows the dock 102 to be rotated about the central axis of the second tube 130. As the first tube 120 is pushed into the second tube 130, the interior wall of the second tube engages the end portion 127 of the leaver 124 to push the lever post 125 outward into the first cutout 132 when the lever post coincides with the first cutout. As the dock 102 is rotated about the central axis of the second tube 130 the lever post 125 travels along the first cutout.

In at least some embodiments, the second tube 130 defines at least one second cutout 134 that is sized to receive the lever post 125 and prevent or hinder rotation of the dock 102 about the central axis of the second tube. In at least some embodiments, each second cutout 134 has a size that is the same as or up to two times the size of the lever post 125 of the lever 124 of the first tube arrangement 108. As the first tube 120 is pushed into the second tube 130, the interior wall of the second tube engages the end portion 127 of the leaver 124 to push the lever post 125 outward into the second cutout 134 when the lever post coincides with the second cutout. In contrast to the first cutout(s) 132, the second cutout(s) 134 prevents or restricts rotation of the dock 102 about the central axis of the second tube 130. The provision of both first and second cutouts 132, 134 allows a user or manufacturer to select between allowing or preventing rotation of the dock 102 about the central axis of the second tube 130.

It will be understood that the lever 124 can be positioned on the second tube 130 and the first and second cutouts 132, 134 can be positioned on the first tube 120 with the first tube having an inner diameter larger than the outer diameter of the second tube.

Returning to FIG. 1A, in at least some embodiments, the mount 100 includes a cover 112, which can be a single piece of multiple pieces, such as the tubular cover 112*a* and the base cover 112*b*. In at least some embodiments, the base cover 112*b* has a curved, square pyramidal shape (or a flared shape), as illustrated in FIG. 1A. Any other suitable shape of the base cover 112*b* can be used.

In at least some embodiments, the cover 112 can include one or more holes 113 and the cap 126 (or other portions of the mount 100) and, optionally, the cover 112 can include one or more markings 115 for facilitating disengagement of the lever post 125 from the first cutout 132 or second cutout 134. Each marking 115 on the cover 112 can be aligned with one of the first or second cutouts 132, 134 and one or more of the holes 113. The marking 115 on the cap 126 (or other portion of the mount 100) is aligned with the lever 124 or lever post 125.

In operation, the first tube arrangement 108, including the cap 126, can be rotated so that a marking 115 on the cap 126 (or other portion of the mount 100) is aligned with a marking on the cover 112 (or with one of the holes 113), as illustrated in FIG. 1A. When the markings 115 are aligned, the hole 113 exposes a portion of one of the first or second cutouts 132, 134 and may expose a portion of the lever post 125. A small tool can be inserted into the hole 113 to push against the lever post 125 so that the lever post 125 disengages from the first or second cutout 132, 134. The first tube arrangement 108 can then be removed from the second tube arrangement 110. Alternatively, the first tube arrangement 108 can be partially removed and then realigned with another one of the first or second cutouts 132, 134 and pushed inwardly to engage that cutout.

A cord 138 (FIG. 1B) is attached, or attachable, to the dock 102. The cord 138 can be permanently attached to the dock 102 or can be permanently attached to the mount 100 or can be removable from both the dock and the mount. The cord 138 has at least one connector 140 for coupling to a power source, data source, or any other suitable device. The cord 138 can have another connector (not shown) for coupling to the dock 102 to provide power or data to the mobile device 180 via the mount 100 and dock 102.

In at least some embodiments, the mount 100 defines a path for the cord 138 to pass through the mount. In at least some embodiments, as illustrated in FIGS. 1B and 1F, the mount 100 includes a first opening 142*a* in the base 128 for entry of the cord into the mount and with the cover 112. In at least some embodiments, a strain relief 144*a* extends out of, or through, the first opening 142*a* and the cord 138 can pass through the strain relief, which reduces harm to the cord at the first opening. In at least some embodiments, the first opening 142*a* is defined by a post 141 extending from the base 128.

In at least some embodiments, the second tube arrangement 110 includes a window 143 in the second tube 130, through which the cord 138 can pass so that the cord can extend along the second tube and first tube 120, as illustrated in FIG. 1D. In at least some embodiments, as illustrated in FIG. 1G, the first tube arrangement 108 includes a second opening 142*b* and an optional second strain relief 144*b* so that the cord can extend out of the mount 100 for coupling attachment or coupling with the dock 102. The dock 102 can include a connector or strain relief 144*c* (FIGS. 2 and 1D) for receiving or coupling the cord 138.

Figure 2:
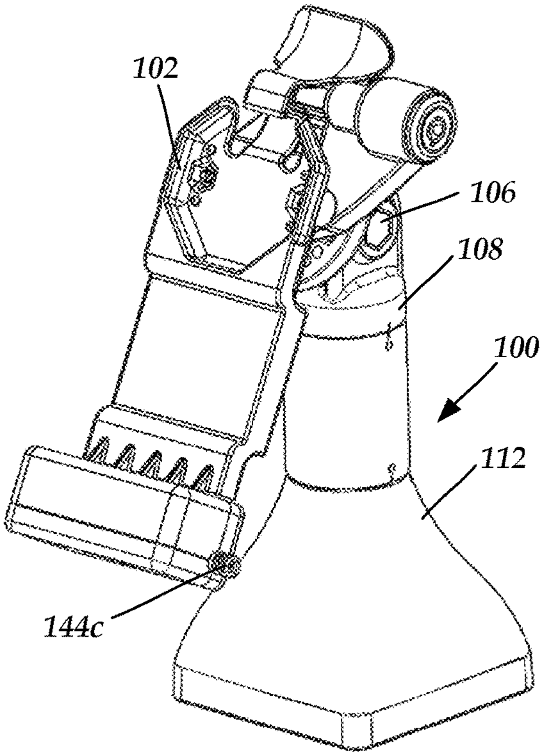
FIG. 2 is a schematic perspective side view of a third embodiment of a mount for a mobile device, according to the invention.
Figure 3A:
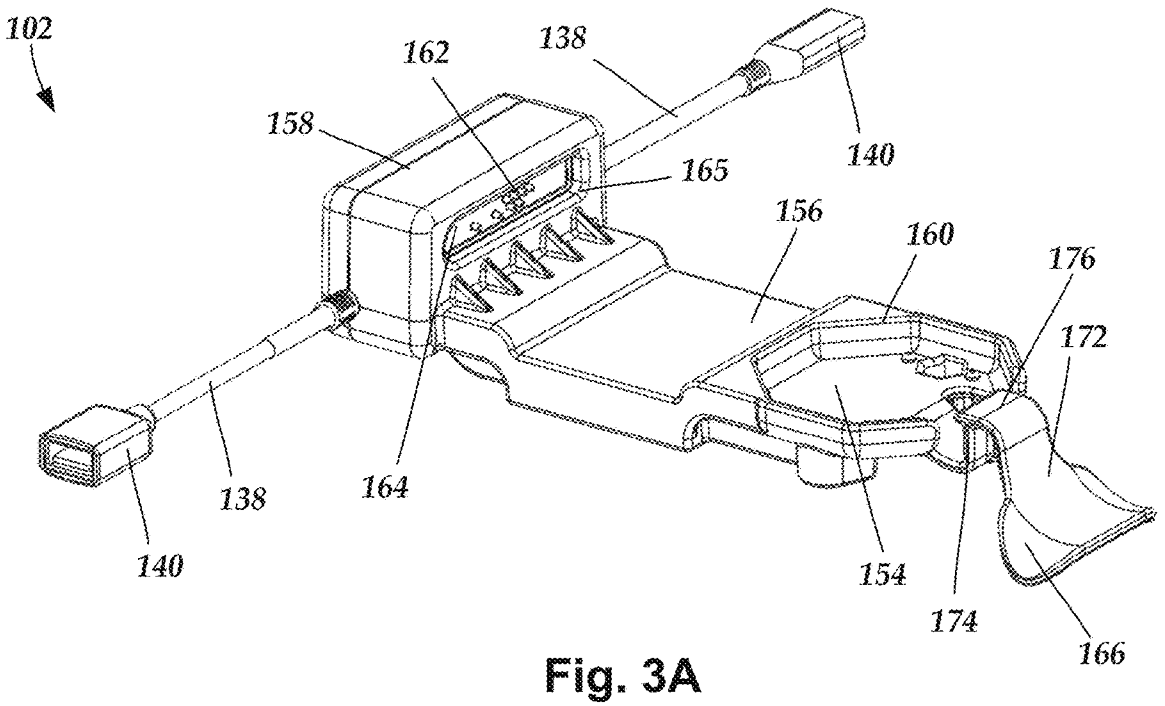
FIG. 3A is a schematic perspective view of one embodiment of a cradle for use as a dock in the mount of FIG. 2, according to the invention.
Figure 3B:
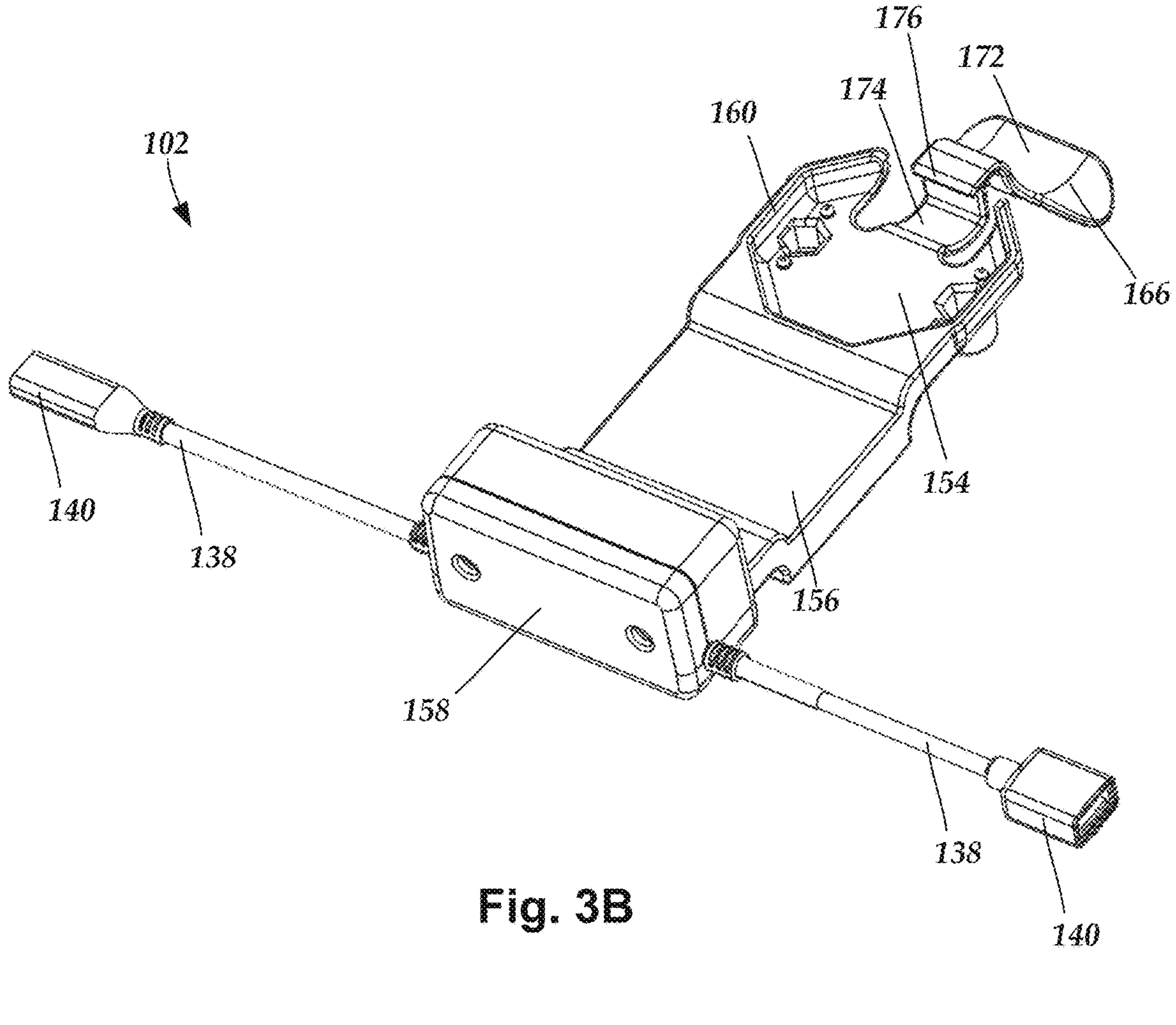
FIG. 3B is a schematic perspective view of the cradle of FIG. 3A from another angle, according to the invention.
Figure 4A:
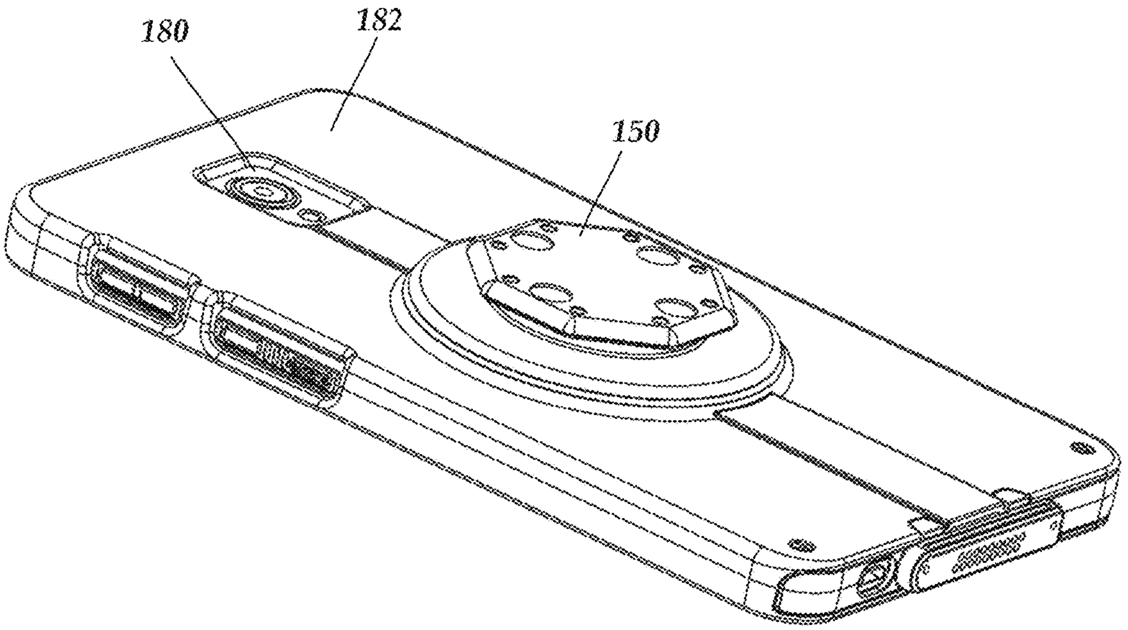
FIG. 4A is a schematic perspective back view of a mobile device contained within a case and having a docking button coupled thereto, according to the invention.
Figure 4B:
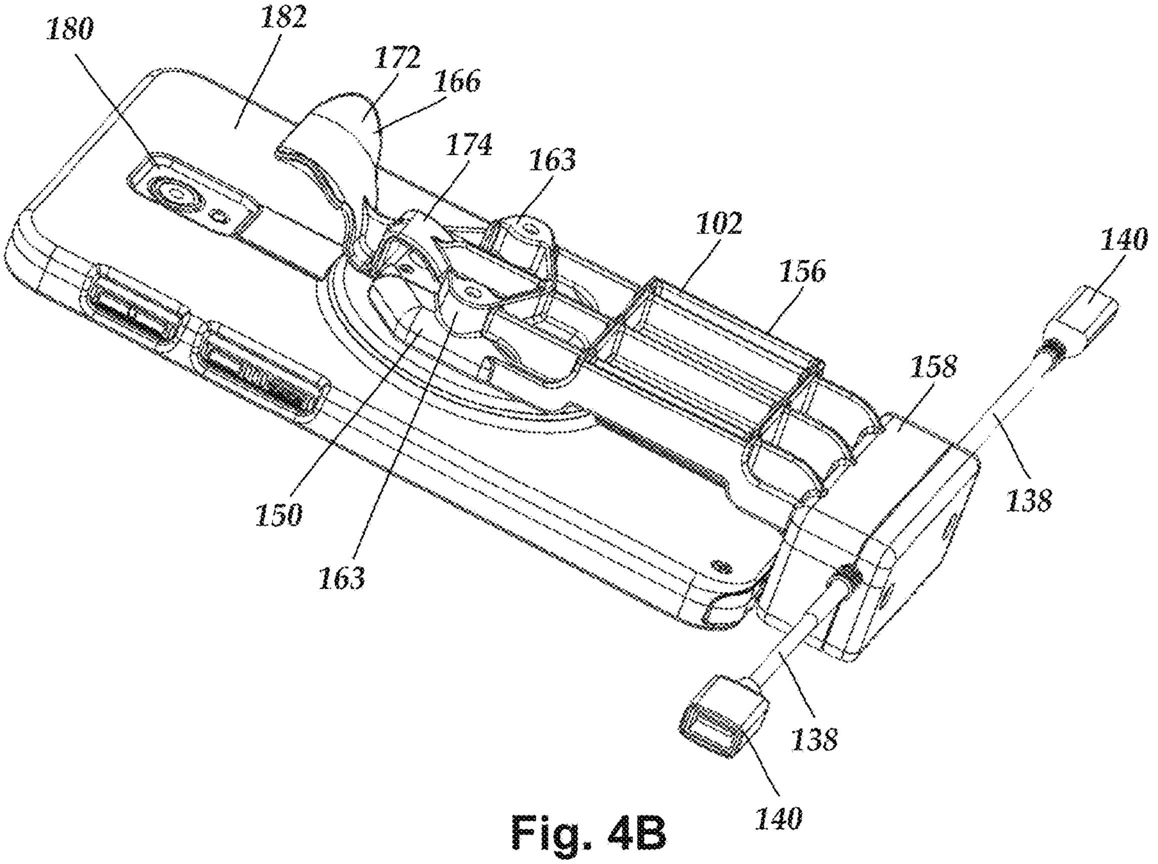
FIG. 4B is a schematic perspective back view of the cradle of FIG. 3A with the mobile device of FIG. 4A received by the cradle, according to the invention.

FIGS. 3A and 3B illustrate one embodiment of a dock 102 of the type illustrated in FIG. 2. In at least some embodiments, the dock 102 includes a docking button receiver 154 and optionally includes a dock base 156 and bottom device receiver 158. For example, the dock 102 of FIGS. 1A to 1I only includes the docking button receiver 154. Examples of other docks 102 can be found in the references cited above. FIG. 4A illustrates a mobile device 180 in a case 182, and a docking button 150 attached to the mobile device for engaging the docking button receiver 154 of the dock 102, as illustrated in FIG. 4B.

In at least some embodiments, the dock 102 includes one or more mounting posts 163 (FIG. 4B) or any other suitable mounting element(s) for mounting the dock 163 to the dock mount base 114 (FIG. 1B). In at least some embodiments, the docking button receiver 154 has a perimeter 160 with a lateral cross-sectional shape and the docking button 150 has a lateral cross-sectional shape complementary to the perimeter or the lateral cross-sectional shape of the docking button indentation.

The bottom device receiver 158 is attached to the cradle base 156 and may be integrally formed with (e.g., permanently attached to or permanently part of) the cradle base or may be detachable from the cradle base. In at least some embodiments, the bottom device receiver 158 includes one or more contacts 162 for making contact with contacts on the mobile device 180 (FIG. 2A) or a case 182 (FIG. 2A) containing the mobile device. Any arrangement of the contacts 162 can be used including, but not limited to, an arrangement of the contacts in one or more rows. When the arrangement includes two or more rows, the contacts in the rows can be aligned or staggered relative to each other. In other embodiments of the dock 100, the contacts 162 can be positioned anywhere in or on the dock such as, for example, in or on the docking button receiver 154, as illustrated in FIG. 1A. In at least some embodiments, the contacts 162 are pogo pins or other biasing contacts that can move up or down relative to the bottom device receiver 158 or docking button receiver 154.

The contacts 162 make electrical contact with contacts on the mobile device 180 (FIG. 4A) or a case 182 (FIG. 4A) disposed on the mobile device when the mobile device is inserted into (e.g., received by) the dock 102. Examples of cases with contacts include, but are not limited to, the cases, covers, or skins described in U.S. Pat. Nos. 9,195,279; 9,331,444; 9,529,387; 9,602,639; 9,632,535; 9,706,026; 10,050,658; 10,054,984; 10,389,399; 10,454,515; 10,630,334; 10,812,643; and 11,289,864, all of which are incorporated herein by reference in their entireties. The contacts 162 in the dock 102 can be used to transfer power to the mobile device 180 (FIG. 4A) from a power source, transfer data between the mobile device and a data source, or any combination thereof. In at least some embodiments, the bottom device receiver 158 which includes a recess 164 surrounded by a rim 165 that may facilitate retention of the mobile device in the dock 102. In at least some embodiments, the recess 164, rim 165, and contacts 162 form a female connector.

A dock 102 can include a latch 166 for engaging the docking button 150. In at least some embodiments, the latch 166 includes a handle 172, a resilient or flexible latch arm 174 coupled to the cradle base 156, and a latching lip 176 configured to engage the docking button 150. Any other suitable latch can be used. In at least some embodiments, the indentation perimeter 160 of the docking button indentation 154 is interrupted by, or partially defined by, the latch 166 (e.g., by the latching lip 176) or elsewhere, as illustrated in FIGS. 3A and 3B. In at least some embodiments, the indentation perimeter 116 of the docking button indentation 154 includes open spaces adjacent to the latch 166. In these embodiments, the shape of the indentation perimeter 116 is considered to be the shape as if these open spaces were filled in.

In at least some embodiments, the latch 166 is manually moveable between a latched position and an unlatched position. In at least some embodiments, the latch 166 is biased toward the latched position. In the latched position, the latch 166 directly engages the docking button 150 for retention of the mobile device 180 on the dock 102. In the unlatched position, the latch 166 disengages from, or is not engaged with, the docking button 150 to permit loading or unloading of the mobile device 180 on the dock 102. In at least some embodiments, the latch 166 is operable using the handle 172 to move the latch between the latched position and the unlatched position. In at least some embodiments, a docking button 150 pushing against the latching lip 176 of the latch 166 can move the latch from the latched position to the unlatched position for insertion of the docking button 150 into the docking button indentation 154 but pulling the docking button 150 against the latching lip 176 does not result in releasing the docking button 150 from the docking button indentation 154. In at least some embodiments, operating the latch handle 172 can result in the resilient latch arm 174 flexing to the unlatched position. In at least some embodiments, the resilient latch arm 174 is biased to maintain the latch 166 in the latched position.

Figure 5A:
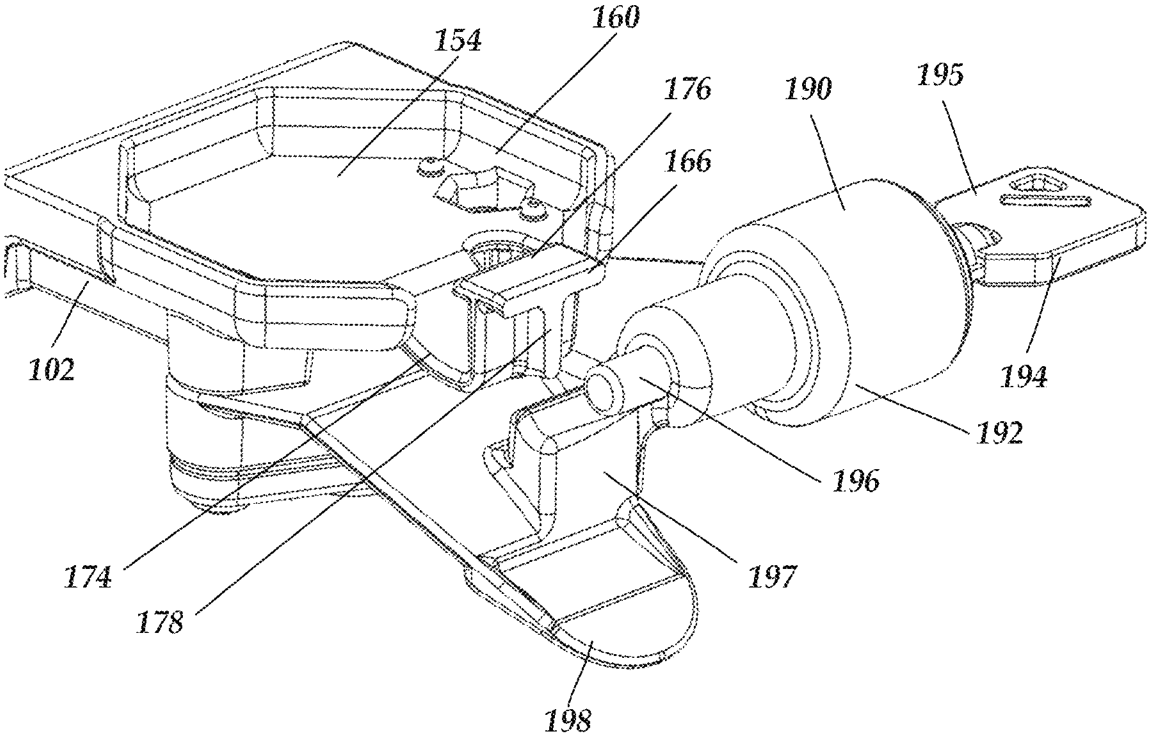
FIG. 5A is a schematic side view of another embodiment of a dock with a latch lock in an unlocked position, according to the invention.
Figure 5B:
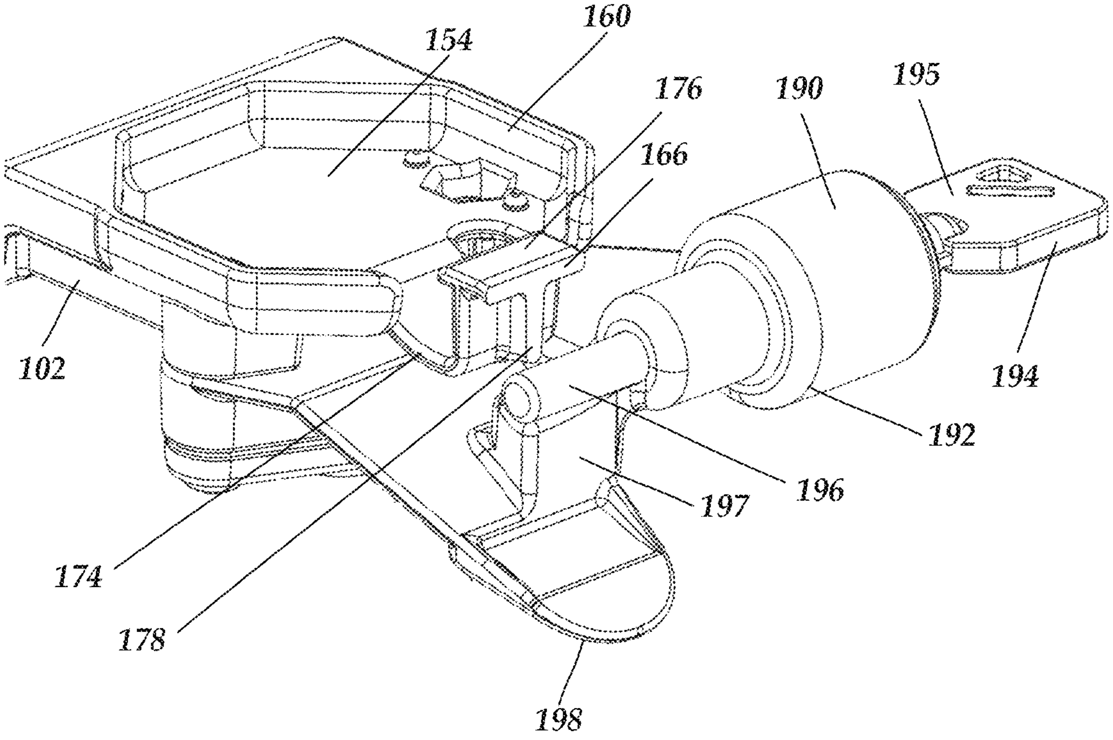
FIG. 5B is a schematic perspective cross-sectional view of the dock of FIG. 5A with the latch lock in a locked position, according to the invention.

In at least some embodiments, a latch lock 190 is part of, or coupled to, the dock 102, as illustrated in FIGS. 5A and 5B. The latch lock 190 is arranged, when in a locked position, to prevent moving the latch 166 to the unlatched position to facilitate retention of the mobile device 180 on the dock 102. The illustrated embodiment of the latch lock 190 includes a lock body 192, a lock actuator 194, and a latch bar 196. FIG. 5A illustrates the latch lock 190 in the unlocked position with the latch bar 196 retracted allowing the latch 166 to move to the unlatched position. FIG. 5B illustrates the latch lock 190 in the locked position with the latch bar 196 extended to hinder the latch 166 from moving to the unlatched position.

In the illustrated embodiment, the latch 166 includes a lock engagement feature 178 that engages the latch bar 196 when the latch lock 190 is in the locked position to halt moving the latch to the unlatched position. In at least some embodiments, the lock body 192 includes a bar platform 197 that a) supports the latch bar 196 when the latch bar 196 is extended or b) provides a stop to movement of the latch 166 while allowing the latch 166 to move to the unlatched position when the latch lock 190 is in the unlocked position or c) both features a) and b). In at least some embodiments, the lock body 192 includes a latch stop 198 that engages the latch handle 172 as the latch handle moves to the unlatched position to resist bending the latch handle too far and possibly damage the latch 166. In at least some embodiments, the latch stop 198 may also provide a surface that the user can use to pinch the latch handle 172 and latch stop 198 between thumb and finger (or two fingers) to move the latch 166 to the unlatched position.

Any suitable lock actuator 194 can be used. In the illustrated embodiment, the lock actuator 194 is a rotating key actuator which extends or retracts the latch bar 196 as the key 195 is rotated. Other actuators include, but are not limited to, other rotating actuators, a push-button actuator, or the like or any combination thereof.

Figure 6:
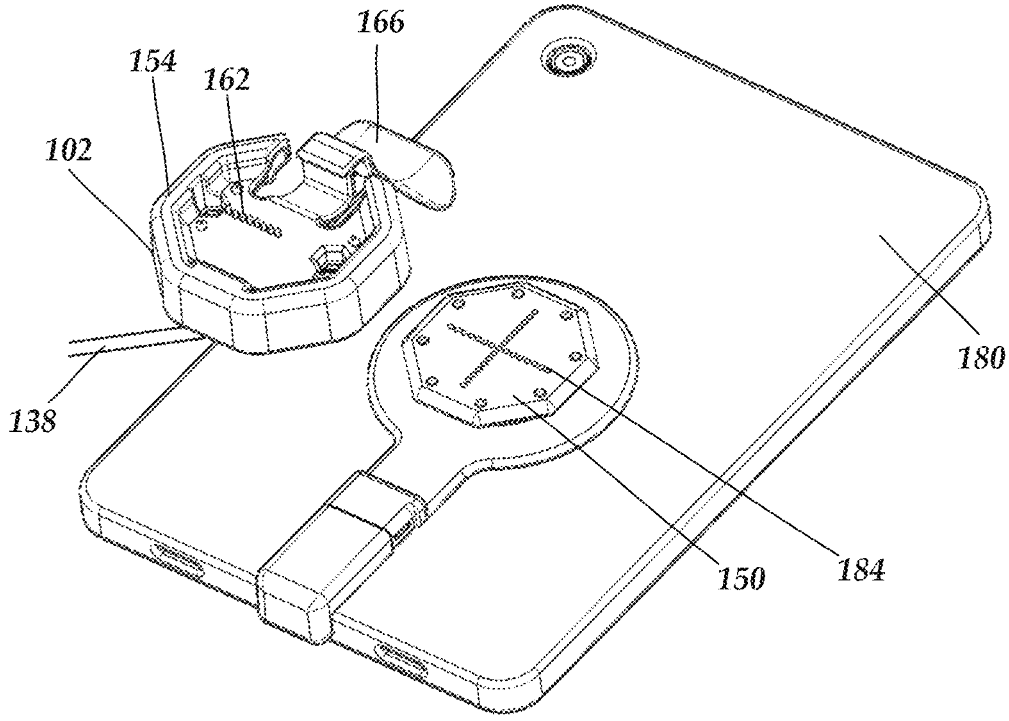
FIG. 6 is a schematic perspective view of one embodiment of a cradle for use as a dock in the mount of FIG. 1A, according to the invention.

FIG. 6 illustrates one embodiment of a dock 102 of the type illustrated in FIG. 1A. The dock 102 includes a docking button receiver 154, one or more contacts 162 for making contact with the contacts 184 on the docking button 150, and an optional latch 166, each of which are the same or similar to the same elements of the dock 102 of FIGS. 3A and 3B.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A mount for a mobile device, the mount comprising:
a dock configured for coupling to the mobile device;
a mounting arm coupled to the dock;
an axle coupled to the mounting arm and configured for rotation of the dock about the axle;
a first tube arrangement comprising a first tube and at least a pair of axle posts extending from the first tube, wherein each of the axle posts defines an axle opening for receiving the axle with a portion of the mounting arm disposed around the axle and between the axle posts;
a second tube arrangement comprising a base and a second tube extending from the base; and
a lever disposed along a first one of the first tube or the second tube, wherein the lever comprises a first end portion with a lever post disposed along the first end portion, a second end portion opposite the first end portion, and at least one fulcrum arm coupled to the first one of the first tube or the second tube and disposed between the first end portion and the second end portion of the lever;
wherein a second one of the first tube or the second tube defines a first cutout extending around at least 50% of a circumference of the second one of the first tube or the second tube, wherein the first cutout is configured to receive the lever post and permit travel of the lever post along the first cutout;
wherein the first one of the first tube or the second tube is configured for insertion into the second one of the first tube or the second tube to receive the lever post in the first cutout, wherein the second one of the first tube or the second tube is configured to engage the second end portion of the lever to bias the lever post outward into the first cutout, wherein the mount is configured for the dock to be rotatable, relative to the base of the second tube arrangement, about two different axes when the lever post is received in the first cutout.

2. The mount of claim 1, wherein the second one of the first tube or second tube further defines a second cutout configured to receive and hold the lever post at a selected position along the circumference of the second one of the first tube or the second tube, wherein the mount is configured for the dock to be rotatable, relative to the base of the second tube arrangement, about one axis when the lever post is received in the second cutout.

3. The mount of claim 1, wherein the dock defines a docking button indentation configured to receive a docking button disposed on, or coupled to, a back surface of the mobile device or of a case containing the mobile device.

4. The mount of claim 1, wherein the dock comprises a cradle configured for receiving the mobile device.

5. The mount of claim 1, further comprising a cover configured to cover at least a portion of the second tube arrangement.

6. The mount of claim 5, wherein the cover defines an opening configured for accessing the lever post of the lever through the cover when the lever post is rotated to align with the opening.

7. The mount of claim 1, wherein the axle comprises a first portion and a second portion, wherein the first portion receives a part of the second portion to form the axle.

8. The mount of claim 1, further comprising a cable extendable through a portion of the mount for coupling the mobile device to a power or data source.

9. A system, comprising:
the mount of claim 1; and
the mobile device.

10. A mount for a mobile device, the mount comprising:
a mounting arm;
an axle coupled to the mounting arm and configured for rotation of the mounting arm about the axle;
a first tube arrangement comprising a first tube and at least a pair of axle posts extending from the first tube, wherein each of the axle posts defines an axle opening for receiving the axle with a portion of the mounting arm disposed around the axle and between the axle posts;
a second tube arrangement comprising a base and a second tube extending from the base; and
a lever disposed along a first one of the first tube or the second tube, wherein the lever comprises a first end portion with a lever post disposed along the first end portion, a second end portion opposite the first end portion, and at least one fulcrum arm coupled to the first one of the first tube or the second tube and disposed between the first end portion and the second end portion of the lever;
wherein a second one of the first tube or the second tube defines a first cutout extending around at least 50% of a circumference of the second one of the first tube or the second tube, wherein the first cutout is configured to receive the lever post and permit travel of the lever post along the first cutout;
wherein the first one of the first tube or the second tube is configured for insertion into the second one of the first tube or the second tube to receive the lever post in the first cutout, wherein the second one of the first tube or the second tube is configured to engage the second end portion of the lever to bias the lever post outward into the first cutout, wherein the mount is configured for the mounting arm to be rotatable, relative to the base of the second tube arrangement, about two different axes when the lever post is received in the first cutout.

11. The mount of claim 10, further comprising a dock configured for coupling to the mobile device, wherein the dock is removably coupled or coupleable to the mounting arm.

12. The mount of claim 11, wherein the dock defines a docking button indentation configured to receive a docking button disposed on, or coupled to, a back surface of the mobile device or of a case containing the mobile device.

13. The mount of claim 11, wherein the dock comprises a cradle configured for receiving the mobile device.

14. The mount of claim 10, wherein the second one of the first tube or second tube further defines a second cutout configured to receive and hold the lever post at a selected position along the circumference of the second one of the first tube or the second tube, wherein the mount is configured for the dock, when coupled thereto, to be rotatable, relative to the base of the second tube arrangement, about one axis when the post is received in the second cutout.

15. The mount of claim 10, further comprising a cover configured to cover at least a portion of the second tube arrangement.

16. The mount of claim 15, wherein the cover defines an opening configured for accessing the lever post of the lever through the cover when the lever post is rotated to align with the opening.

17. The mount of claim 10, wherein the axle comprises a first portion and a second portion, wherein the first portion receives a part of the second portion to form the axle.

18. The mount of claim 10, further comprising a cable extendable through a portion of the mount for coupling the mobile device to a power or data source.

19. A system, comprising:

the mount of claim 10; and the mobile device.

20. The system of claim 19, further comprising the dock configured for coupling to the mobile device, wherein the dock is removably coupled or coupleable to the mounting arm.

* * * * *